US008778518B2

(12) United States Patent
Baek

(10) Patent No.: US 8,778,518 B2
(45) Date of Patent: Jul. 15, 2014

(54) BATTERY PACK

(75) Inventor: Woon-Seong Baek, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 265 days.

(21) Appl. No.: 13/083,486

(22) Filed: Apr. 8, 2011

(65) Prior Publication Data

US 2012/0070698 A1    Mar. 22, 2012

(30) Foreign Application Priority Data

Sep. 16, 2010  (KR) .................. 10-2010-0091097

(51) Int. Cl.
*H01M 14/00* (2006.01)
*H01M 10/42* (2006.01)

(52) U.S. Cl.
CPC ............. *H01M 10/42* (2013.01); *Y02E 60/12* (2013.01)
USPC ............. 429/7; 429/79; 429/153; 429/163; 429/175; 429/178

(58) Field of Classification Search
CPC ...................................................... H01M 10/42
USPC ................... 429/79, 153, 163, 175, 178
See application file for complete search history.

(56) References Cited

U.S. PATENT DOCUMENTS

| 7,563,535 | B2 | 7/2009 | Hiratsuka |
| 2007/0287063 | A1 | 12/2007 | Hiratsuka et al. |
| 2009/0087734 | A1 | 4/2009 | Akatsuchi et al. |
| 2010/0143793 | A1 | 6/2010 | Yamamoto |
| 2010/0151281 | A1 | 6/2010 | Kwag et al. |

FOREIGN PATENT DOCUMENTS

| JP | 2003-303580 | | 10/2003 |
| JP | 2006-107922 | | 4/2006 |
| KR | 10-2007-0038113 | A | 4/2007 |
| KR | 10-2008-0017321 | A | 2/2008 |
| KR | 10-2009-0031159 | A | 3/2009 |
| KR | 10-2009-0033072 | A | 4/2009 |
| KR | 10-2010-0069159 | | 6/2010 |
| WO | WO 2006/126379 | * | 11/2006 |

* cited by examiner

*Primary Examiner* — Patrick Ryan
*Assistant Examiner* — Alex Usyatinsky
(74) *Attorney, Agent, or Firm* — Knobbe Martens Olson & Bear LLP

(57) ABSTRACT

A battery pack includes a bare cell sealed by a cap plate, a circuit board disposed on the cap plate, a cover coupled to the cap plate, and a size control unit formed between the upper cover and the circuit board.

15 Claims, 9 Drawing Sheets

BATTERY PACK

RELATED APPLICATIONS

This application claims the benefit of Korean Patent Application No. 10-2010-0091097, filed on Sep. 16, 2010, in the Korean Intellectual Property Office, the disclosure of which is incorporated herein in its entirety by reference.

BACKGROUND

1. Field

One or more embodiments of the present invention relate to a battery pack, and more particularly, to a battery pack configured to have a combination of a battery and a circuit.

2. Description of the Related Technology

As technology for mobile devices, such as mobile phones and notebooks, has developed and the use of the mobile devices has increased, the demand for secondary batteries for use as energy sources has increased. Recently, as a substitute energy source for replacing fossil fuel, secondary batteries are being studied and developed for use in electric vehicles and hybrid vehicles.

In general, secondary batteries are used in the form of a battery pack. Since the secondary batteries typically include an inflammable material, to maintain the stability of the secondary batteries, the battery pack has circuits for effectively controlling abnormal operation states including overcharge, over-discharge, over-current, and the like, and also has a cover for protecting and insulating the circuits from an external environment.

The quality of a battery pack is determined based on a managed size for evaluating the battery pack, the characteristics of a protection circuit, stability, etc. From among them, since the managed size may be recognized by anyone and should meet requirements for an appearance designed by customers, size management is important.

SUMMARY

The terminal depth for electrical connection with a mobile device relates to the efficiency of the battery pack. A battery pack having a cover assembly structure is difficult to meet requirements for a terminal depth because of debris generated when a cover is injection-molded.

One or more embodiments of the present invention include a battery pack that meets product specifications required by customers.

One or more embodiments of the present invention include a battery pack that has a uniform terminal depth and may allow size control with high precision.

Additional aspects will be set forth in part in the description which follows and, in part, will be apparent from the description, or may be learned by practice of the presented embodiments.

According to one or more embodiments of the present invention, a battery pack includes: a bare cell sealed by a cap plate; a circuit board disposed on the cap plate; a cover coupled to the cap plate; and a size control unit formed between the cover and the circuit board.

The size control unit may include a protrusion protruding from the cover to contact the circuit board. The protrusion may be integrally formed with the cover.

The size control unit may include a protrusion protruding from the circuit board to contact the cover. The protrusion may be integrally formed with the circuit board.

The size control unit may be separately formed from the circuit board and the cover, and include a member inserted between the circuit board and the cover.

The battery pack may further include an external connection terminal formed on the circuit board, wherein a terminal hole is formed in the cover to expose the external connection terminal.

The size control unit may be formed around the terminal hole. A plurality of the size control units may be formed at both sides of the terminal hole.

The size control unit may have an elongate shape extending in a long-side direction of the terminal hole.

The size control unit may be formed around the external connection terminal. A plurality of the size control units may be formed at both sides of the external connection terminal.

The size control unit may have an elongate shape extending in a long-side direction of the external connection terminal.

A first thickness of the external connection terminal formed on the circuit board may be equal to or greater than a second thickness of the size control unit.

The size control unit may have an elongate shape extending in a short-side direction of the cover or the circuit board.

According to another aspect of the present invention, a battery pack includes: a bare cell sealed by a cap plate; a circuit board disposed on the cap plate; a cover coupled to the bare cell to face the circuit board; and a protrusion having a first surface contacting the cover and a second surface contacting the circuit board.

The battery pack may further include an external connection terminal formed on the circuit board, wherein a terminal hole is formed in the cover to expose the external connection terminal.

A plurality of the protrusions may be formed at both sides of the external connection terminal and each protrusion may have an elongate shape extending in a long-side direction of the external connection terminal.

A plurality of the protrusions may be formed at both sides of the terminal hole, and each protrusion may have an elongate shape extending in a long-side direction of the terminal hole.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
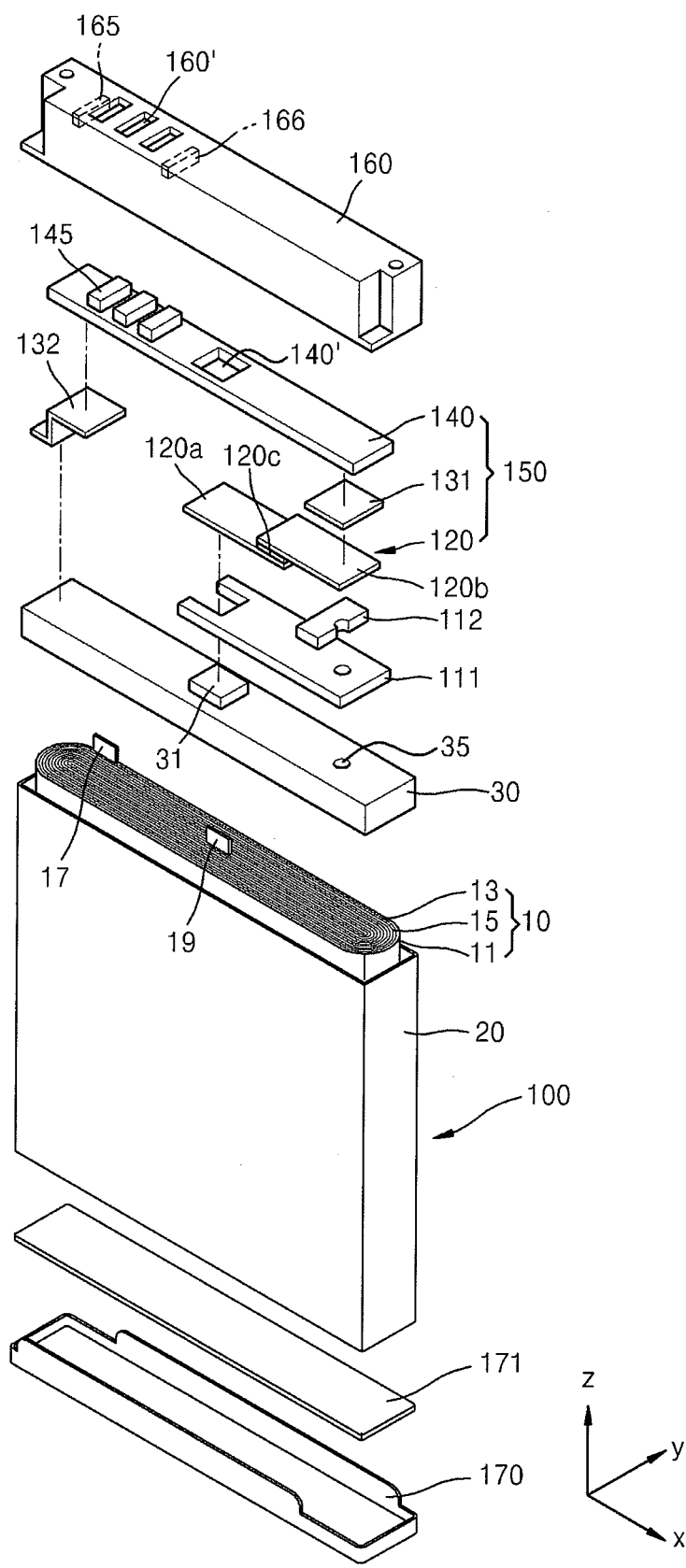
FIGS. 1 through 3 are exploded perspective views of a battery pack according to an embodiment of the present invention.
Figure 2:
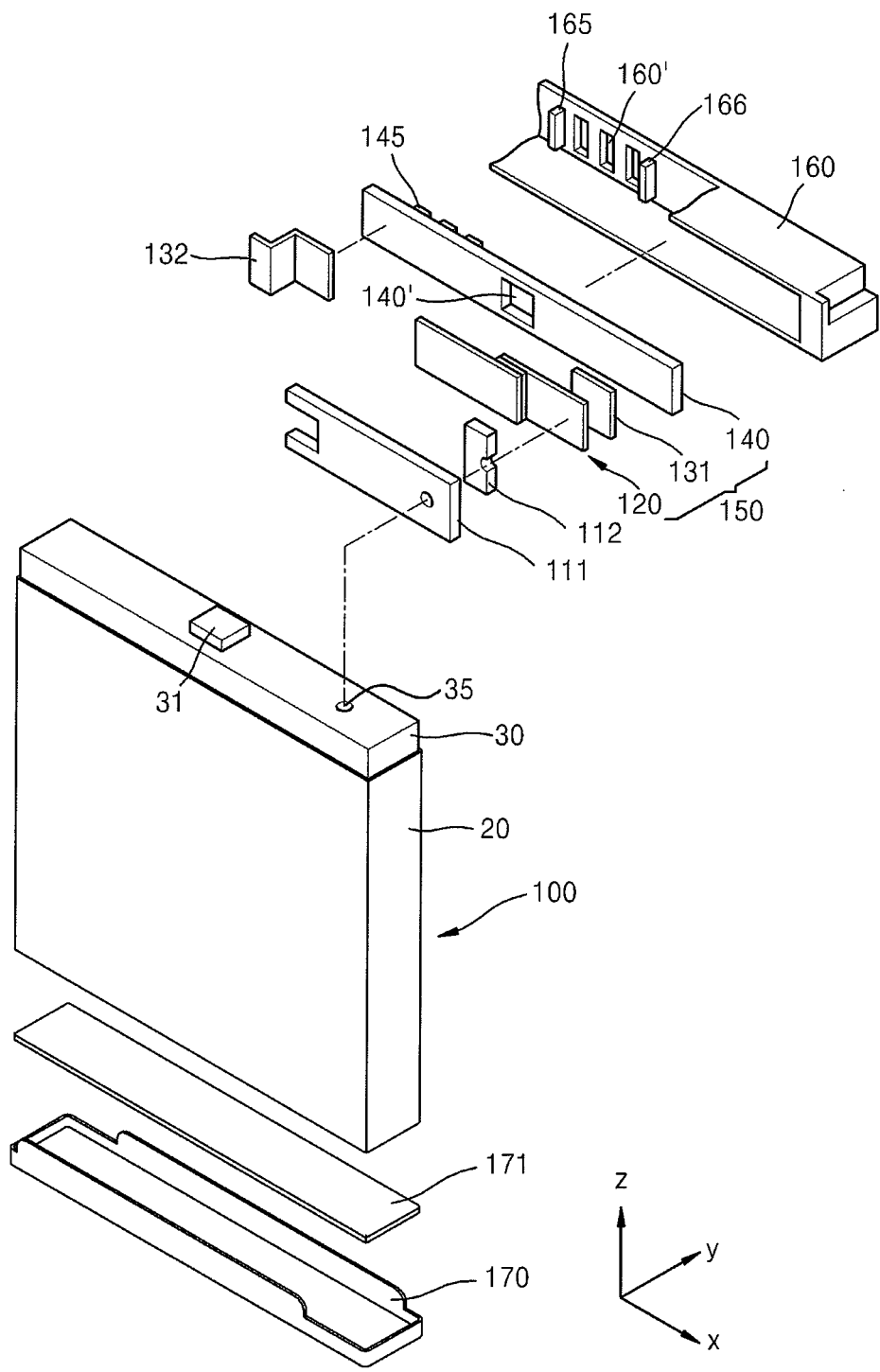
Figure 3:
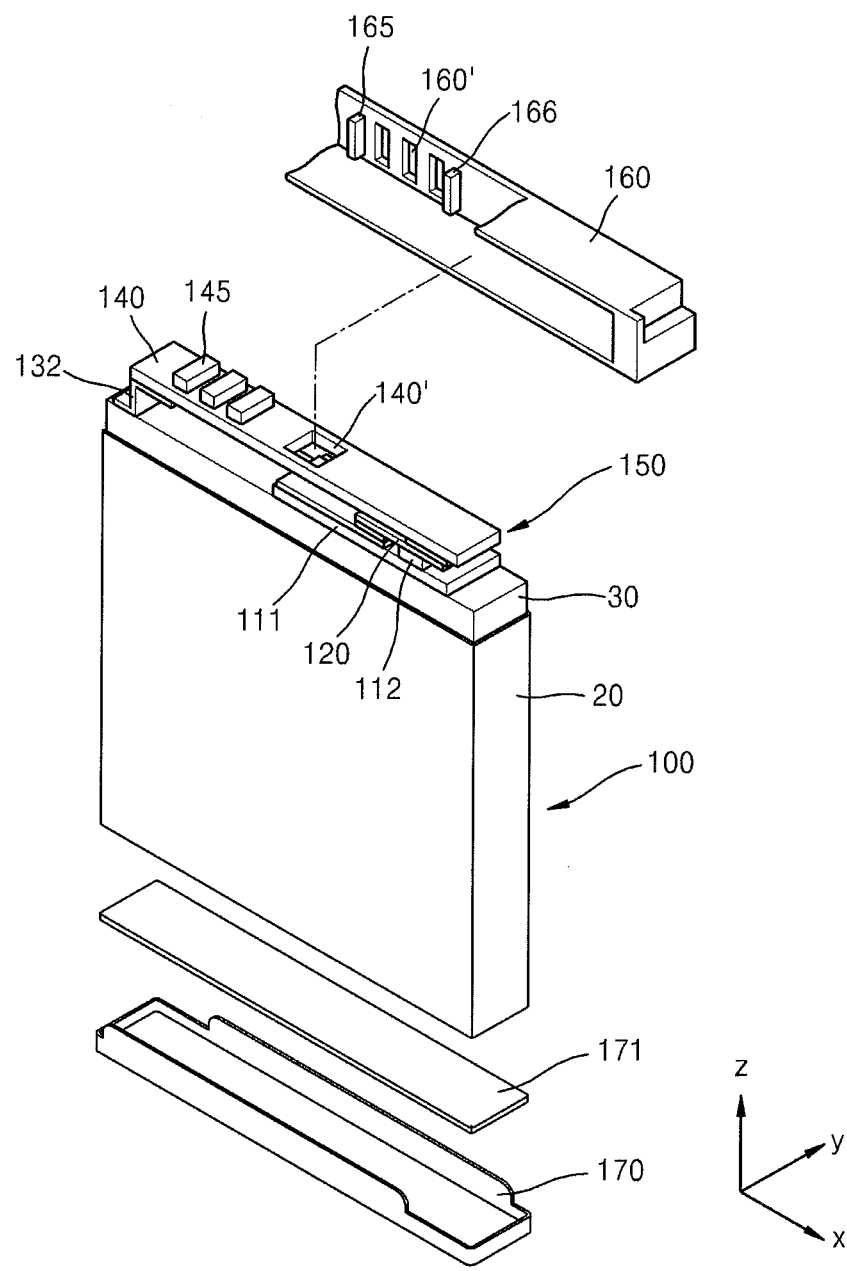

The present invention will now be described more fully with reference to the accompanying drawings, in which certain embodiments of the invention are shown. FIGS. 1 through 3 are exploded perspective views of a battery pack according to an embodiment of the present invention.

Referring to FIGS. 1 through 3, a battery pack according to an embodiment includes a bare cell 100 including a power generating element, a protection circuit module 150 mounted on the bare cell 100 and designed to control charging and discharging operations of the bare cell 100, and an upper cover 160 coupled to the bare cell 100 to receive the protection circuit module 150.

The bare cell 100, which is a rechargeable secondary battery, may be a lithium-ion battery, and may be formed by sealing an electrode assembly 10 including a positive electrode plate 11, a negative electrode plate 13, and a separator 15, into a can 20 with an electrolyte (not shown). For example, the bare cell 100 may include an electrode assembly 10 that is formed by winding the positive electrode plate 11, the negative electrode plate 13, and the separator 15 in a jelly-roll configuration, such that the can 20 has an open top to receive the electrode assembly 10 and the electrolyte, and a cap plate 30 for sealing the open top of the can 20. A contact portion between the cap plate 30 and the can 20 may be hermetically sealed, for example, by laser welding.

A positive electrode tab 17 and a negative electrode tab 19 may be each connected to at least one part of the positive electrode plate 11 and the negative electrode plate 13. For example, the positive electrode tab 17 may be connected to the cap plate 30, and the negative electrode tab 19 may be connected to an electrode terminal 31 protruding from a top surface of the cap plate 30. The electrode terminal 31 may be insulated and coupled to the cap plate 30, and protrude from the top surface of the cap plate 30.

The protection circuit module 150 may control charging and discharging operations of the bare cell 100. When overcurrent that exceeds a threshold value flows, the temperature of the bare cell 100 can be increased to a level higher than a set value, or when there is overcharge or over-discharge, the protection circuit module 150 can stop the flow of current to protect the bare cell 100.

For example, the protection circuit module 150 may include a circuit board 140 that includes a charge and discharge protection circuit or a sensing circuit for detecting state information such as current and voltage, a protection element 120 connected to the circuit board 140 and designed to restrict the flow of charge and discharge current according to rises in temperature, and an external connection terminal 145 mounted on the circuit board 140 and designed to electrically connect to an external device (not shown). To this end, the protection circuit module 150 may include a charge and discharge switching element (not shown), a capacitor (not shown) and a passive element such as a resistor.

The protection element 120 can form a charge and discharge current path between the circuit board 140 and the electrode terminal 31 of the cap plate 30. The protection element 120 can forcibly reduce charge and discharge current when the temperature of the bare cell 100 exceeds a set threshold value to increase electric resistance. The protection element 120 may include a positive temperature coefficient (PTC) element or a temperature fuse. If the protection element 120 includes a PTC element, the protection element 120 may include a variable resistor 120c whose electric resistance varies according to temperature, and first and second connection members 120a and 120b connected to the variable resistor 120c and extending in opposite directions. For example, the first connection member 120a may be connected to the electrode terminal 31 of the cap plate 30 whereas the second connection member 120b may be connected to the circuit board 140.

For example, the first connection member 120a of the protection element 120 may be welded onto the electrode terminal 31 of the cap plate 30. A through hole 140' may be formed at a substantially central position of the circuit board 140, and a welding mechanism, e.g., a welding rod-shaped electrode, may be inserted into the through-hole 140' so that spot welding, which is a type of resistance welding, may be performed between the first connection member 120a of the protection element 120 and the electrode terminal 31.

The second connection member 120b of the protection element 120 may be connected to a first electrode pad (not shown) of the circuit board 140. A conductive plate 131 may be interposed between the second connection member 120b and the circuit board 140 to electrically connect the second connection member 120b to the circuit board 140.

The positive electrode tab 17 and the negative electrode tab 19 of the bare cell 100 may be electrically connected to electrode pads of the circuit board 140, respectively. For example, the negative electrode tab 19 of the bare cell 100 may be connected to the first electrode pad of the circuit board 140 through the electrode terminal 31 and the protection element 120, and the positive electrode tab 17 of the bare cell 100 may be connected to a second electrode pad (not shown) of the circuit board 140 through a lead member 132. The lead member 132 may have a stepped shape including a top connected to the circuit board 140 and a bottom extending to contact the cap plate 30.

The external connection terminal 145 may be electrically connected to an external device (not shown). In detail, the external connection terminal 145 can form a contact point with an external load, e.g., a mobile device, or an external power supply device, and relay the flow of power and signal transmission/reception. For example, the external connection terminal 145 may include a power terminal for inputting/outputting charge and discharge current, and a signal transmission terminal for data communication with the external device.

An insulating tape 111 and an insulating spacer 112 may be interposed between the protection circuit module 150 and the cap plate 30. The insulating plate 111 and the insulating spacer 112 can prevent the protection circuit module 150 and the cap plate 30 from being electrically short-circuited. For example, the insulating tape 111 may be interposed between the protection element 120 and the cap plate 30 to prevent an electrical short-circuit between the protection element 120 and the cap plate 30. Also, the insulating tape 111 and the insulating spacer 112 may function to fix the protection circuit module 150 to the cap plate 30.

The insulating spacer 112 can also function to support a part of the protection circuit module 150 at a predetermined height from the cap plate 30. The insulating spacer 112 can support a stepped structure formed between the first and second connection members 120a and 120b on both sides of the protection element 120, and the protection element 120 may be coupled to the cap plate 30 with the insulating spacer 112 for supporting the stepped structure therebetween. Meanwhile, the insulating tape 111 and the insulating spacer 112 may have a cut portion corresponding to a safety vent 35 in order not to close the safety vent 35 formed in the cap plate 30.

The upper cover 160 may be assembled to the bare cell 100 on which the protection circuit module 150 is mounted to receive the protection circuit module 150. An open terminal hole 160' may be formed in the upper cover 160 to expose the external connection terminal 145 of the circuit board 140 and allow connection with an external device (not shown).

A plurality of protrusions 165 and 166 may be formed on the bottom surface of the upper cover 160 as size control units. The protrusions 165 and 166 can protrude toward the circuit board 140 from the upper cover 160, extend to contact the circuit board 140, and constantly maintain a gap between the upper cover 160 and the circuit board 140. Each of the protrusions 165 and 166 may have a slender rectangular shape having a top surface (a surface in a +z direction) which contacts the upper cover 160, and a bottom surface (a surface in a −z direction) which contacts the circuit board 140, and may extend in a first direction (a y direction).

Although two protrusions 165 and 166 are shown in FIG. 2, the present embodiment is not limited thereto, and two or more protrusions may be formed and may stably maintain a gap between the upper cover 160 and the circuit board 140 by being interposed between the upper cover 160 and the circuit board 140.

That is, two or more protrusions may be formed in such a manner that facing surfaces of the upper cover 160 and the circuit board 140 are disposed in parallel to be spaced apart from each other by a predetermined gap and not obliquely inclined with respect to each other. For example, the protrusions 165 and 166 may be disposed at symmetric positions on the upper cover 160, and may stably maintain a gap between the upper cover 160 and the circuit board 140 by being interposed between the upper cover 160 and the circuit board 140.

The protrusions 165 and 166 may be integrally formed with the upper cover 160, and may be formed symmetrically with each other about the terminal hole 160'.

An insulating label sheet (not shown) having a rear surface coated with an adhesive may be adhered and wound around an outer circumferential surface of the bare cell 100. A lower cover 170 may be coupled to a bottom of the bare cell 100 by means of an adhering unit 171, such as a double-sided tape.

Figure 4:
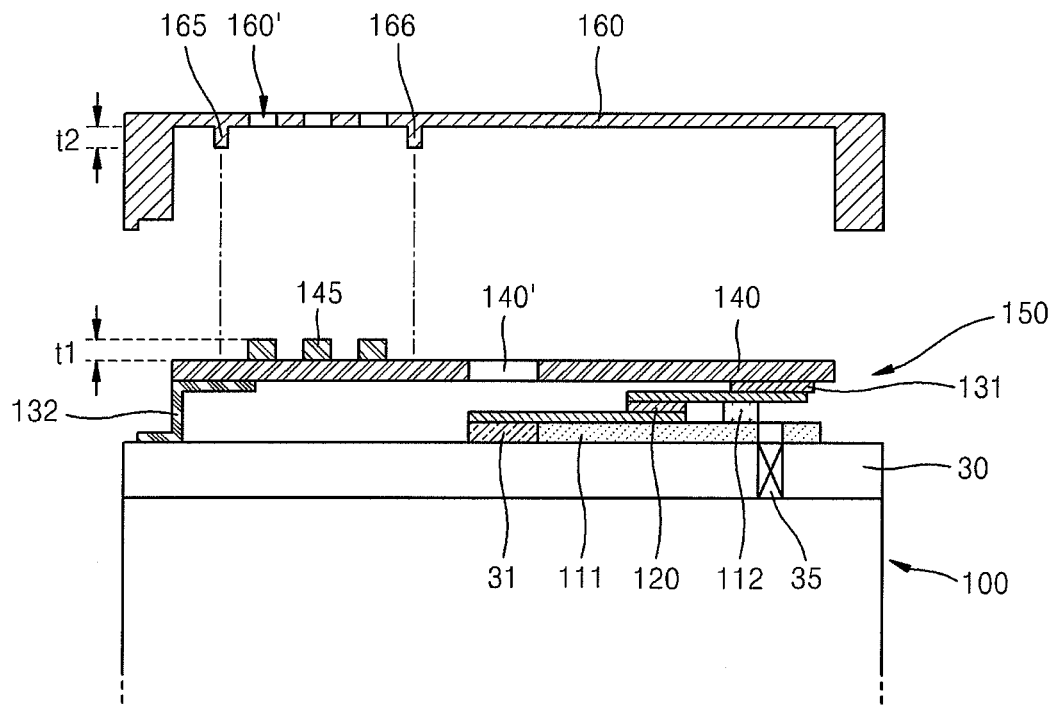
FIG. 4 is a cross-sectional view of the battery pack of FIG. 1 before an upper cover is assembled.
Figure 5:
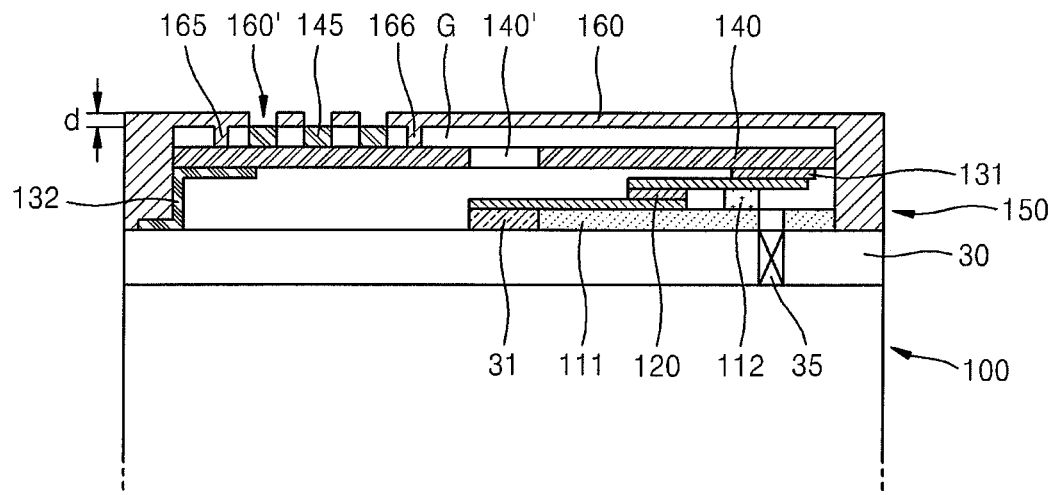
FIG. 5 is a cross-sectional view of the battery pack of FIG. 1 after the upper cover is assembled.
Figure 6:
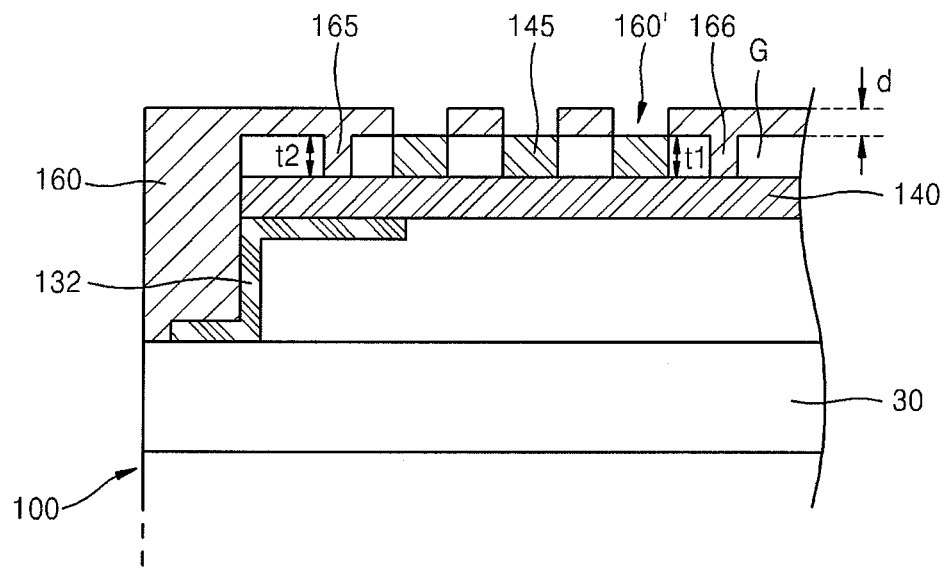
FIG. 6 is an enlarged cross-sectional view illustrating major elements in FIG. 5.

FIGS. 4 and 5 are cross-sectional views of the battery pack of FIG. 1, respectively, before the upper cover 160 is assembled and after the upper cover 160 is assembled. FIG. 6 is an enlarged cross-sectional view illustrating major elements in FIG. 4.

Referring to FIGS. 4 through 6, the protrusions 165 and 166 may help manage the overall appearance of the battery pack by allowing the circuit board 140 and the upper cover 160 to be assembled at positions where the circuit board 140 and the upper cover 160 are spaced apart from each other by a predetermined gap G, thereby reducing the rate of failure that may occur by size errors.

The protrusions 165 and 166 can function to constantly maintain a terminal depth "d" of the terminal hole 160' formed in the upper cover 160. This will be explained in more detail as follows. The terminal hole 160' for electrical connection with an external device (not shown), e.g., an external load or an external charging device, may be formed in the upper cover 160. The terminal hole 160' may be vertically aligned with the external connection terminal 145 of the circuit board 140, and can allow connection with the external device by exposing the external connection terminal 145 to the outside.

As shown in FIG. 6, the terminal depth "d" of the terminal hole 160' may refer to the vertical distance between the top surface of the upper cover 160 in which the terminal hole 160' is formed and the external connection terminal 145 corresponding to the terminal hole 160'. For example, a connection unit (not shown) of the external device may have an insertion length that is at least as long as the terminal depth "d", may be connected to the external connection terminal 145, and may form an electrical contact point with the external connection terminal 145. In this case, in order to achieve stable electrical connection between the battery pack and the external device, it is preferable that the terminal depth "d" of the battery pack is standardized to a predetermined value and the connection unit of the external device may be designed in accordance with the value of the terminal depth "d".

The protrusions 165 and 166 of the upper cover 160 can function to correct size by constantly maintaining the terminal depth "d" of the terminal hole 160' irrespective of various geometric errors occurring in the upper cover 160. In detail, the upper cover 160 may be formed by various molding processes, and various geometric errors may probably occur in the upper cover 160 according to characteristics of the molding processes. In particular, an unexpected geometric error, such as caused by debris, may be generated in an open portion, that is, a discontinuous portion, such as the terminal hole 160'.

For example, when the upper cover 160 is injection-molded, part of the molding resin may be introduced around a wall defining the terminal hole 160' due to a high injection pressure, and remain around the wall of the terminal hole 160' in the form of debris. The debris may have a size of about 0.05 mm.

Figure 7:
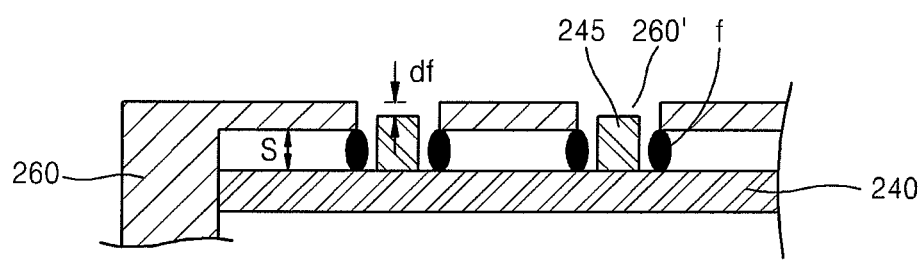
FIG. 7 is a cross-sectional view of a battery pack according to a comparative example.

FIG. 7 is a cross-sectional view illustrating a part of a battery pack according to a comparative example. Referring to FIG. 7, an external connection terminal 245 formed on a circuit board 240 may be exposed to the outside through a terminal hole 260' of an upper cover 260. The debris "f" can form around the terminal hole 260' of the upper cover 260. In this case, since the debris "f" is interposed between the upper cover 260 and the circuit board 240, a gap S having a predetermined size can form between the upper cover 260 and the circuit board 240, and a terminal depth "df" of the terminal hole 260' can be determined by the size of the debris "f" that is not controlled. As a result, since the terminal depth "df" is arbitrarily determined according to processing error, overall loss during processing can increase. For example, it can get difficult to perform size management, the product failure rate can increase, and stricter process management would be required to meet product specifications.

As shown in FIG. 6, since the protrusions 165 and 166 may be formed on the bottom surface of the upper cover 160 facing the circuit board 140, the gap G between the circuit board 140 and the upper cover 160 may be constantly maintained, and the terminal depth "d" of the terminal hole 160' may be controlled to be a standardized value. In this case, by designing the thickness "t2" of each of the protrusions 165 and 166 to exceed an expected maximum geometric error, the terminal depth "d" may be maintained at a constant level, irrespective of various types of geometric errors. For example, the thickness "t2" of each of the protrusions 165 and 166 may range from about 0.02 mm to about 0.2 mm.

In FIG. 6, the protrusions 165 and 166 may be formed around the terminal hole 160'. In detail, the protrusions 165 and 166 may be formed at both sides of the terminal hole 160'. A plurality of the terminal holes 160' may be formed to correspond with a plurality of the external connection terminals 145 formed on the circuit board 140, for example, first and second power terminals and signal transmission terminals. In this case, in order to make terminal depths "d" of the plurality of terminal holes 160' uniform, the protrusions 165 and 166 may be formed at both sides of the terminal holes 160'. The protrusions 165 and 166 may have substantially the same thickness "t2" and may support the same gap G between the upper cover 160 and the circuit board 140 at symmetric positions about the terminal holes 160', so that the terminal holes 160' have uniform terminal depths "d".

The external connection terminal 145 may be formed to have a first thickness "t1" on the circuit board 140, and may be exposed to the outside through the terminal hole 160' of the upper cover 160. In this case, the first thickness "t1" of the external connection terminal 145 may be set to be equal to or greater than the second thickness "t2" of each of the protrusions 165 and 166. That is, the protrusions 165 and 166 can support the constant gap G between the upper cover 160 and the circuit board 140, and the upper cover 160 and the circuit board 140 may be spaced apart from each other by the gap G corresponding to the second thickness "t2" of each of the protrusions 165 and 166. The external connection terminal 145 can protrude to the first thickness "t1" along the gap G corresponding to the second thickness "t2". In this case, if the first thickness "t1" of the external connection terminal 145 is designed to be equal to the second thickness "t2" of each of the protrusions 165 and 166, a top surface of the external connection terminal 145 and the bottom surface of the upper cover 160 may be disposed substantially on the same surface. If the first thickness "t1" of the external connection terminal 145 is designed to be equal to or greater than the second thickness "t2" of the protrusions 165 and 166, the external connection terminal 145 may block the terminal hole 160' of the upper cover 160, thereby preventing harmful substances from penetrating through the terminal hole 160'.

Figure 8:
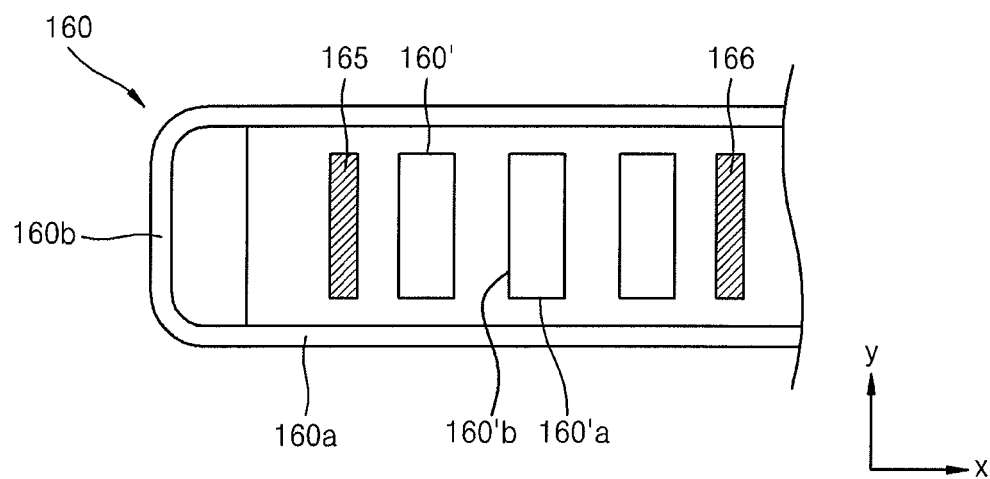
FIG. 8 is a plan view illustrating the upper cover on which a size control unit is formed.

The protrusions 165 and 166 may have various shapes as long as the protrusions 165 and 166 support the constant gap G between the upper cover 160 and the circuit board 140. In FIG. 8, each of the protrusions 165 and 166 may have a slender shape longitudinally extending in a first direction (y direction). Since the protrusions 165 and 166 contact corresponding positions of the circuit board 140, each of the protrusions 165 and 166 may have a slender shape extending in the first direction in order to reduce a contact area between the protrusions 165 and 166 and the circuit board 140 for the purpose of improving mounting efficiency of the circuit board 140, and in order to stably support the gap G between the upper cover 160 and the circuit board 140.

For example, each of the protrusions 165 and 166 may have a slender shape longitudinally extending in the direction of the short side (y direction) of the upper cover 160. That is, the upper cover 160 may have a substantially rectangular shape having a long side 160a and a short side 160b, and the protrusions 165 and 166 may extend in a direction of the short-side 160b (referred to as the short-side direction) of the upper cover 160.

Considering a plurality of circuit elements mounted on the circuit board 140, to extend the protrusions 165 and 166 in the short-side direction (y direction) of the upper cover 160, that is, in the short-side direction (y direction) of the circuit board 140, may improve mounting efficiency of the circuit board 140.

Also, each of the protrusions 165 and 166 may have a slender shape longitudinally extending in the direction of the long side (y direction) of the terminal hole 160'. That is, the terminal hole 160' may have a substantially rectangular shape having a long side 160'b and a short side 160'a, and each of the protrusions 165 and 166 may extend in the direction of the long side 160'b (referred to as the long-side direction) of the terminal hole 160'. The protrusions 165 and 166 formed in this way may eliminate the difference of the terminal depth "d" in the longitudinal direction (y direction) of the terminal hole 160', thereby achieving a uniform terminal depth "d". However, the present embodiment is not limited thereto.

Figure 9:
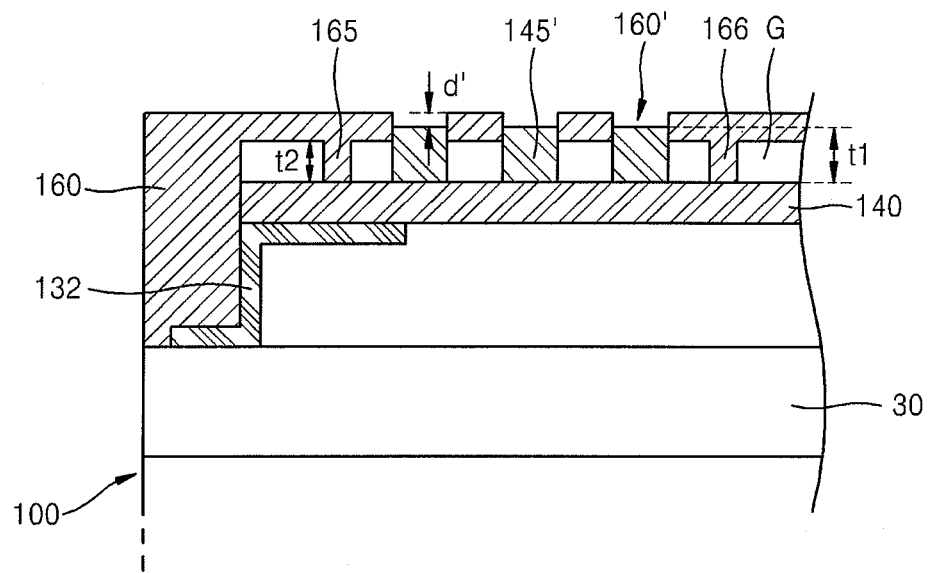
FIG. 9 is a cross-sectional view of a battery pack according to another embodiment of the present invention.

FIG. 9 is a cross-sectional view of a battery pack according to another embodiment of the present invention. Referring to FIG. 9, the upper cover 160 may be assembled to the bare cell 100 on which the circuit board 140 is mounted. External connection terminals 145' may protrude from the circuit board 140, and terminal holes 160' corresponding to the external connection terminals 145' may be formed in the upper cover 160. The external connection terminals 145' may be exposed to the outside through the terminal holes 160' and connected to an external device (not shown).

The protrusions 165 and 166 may be formed as a size control unit between the upper cover 160 and the circuit board 140. For example, the protrusions 165 and 166 may protrude from the upper cover 160 to contact the circuit board 140, and may be integrally formed with the upper cover 160. The protrusions 165 and 166 can support a constant gap G between the upper cover 160 and the circuit board 140, and control terminal depths "d" of the terminal holes 160' to a predetermined size.

Each of the external connection terminals 145' may be formed to have a first thickness "t1" on the circuit board 140, and each of the protrusions 165 and 166 may be formed to have a second thickness "t2" on the upper cover 160. In this case, the first thickness "t1" of each of the external connection terminals 145 may be set to be equal to or greater than the second thickness "t2" of each of the protrusions 165 and 166 (t1≥t2). That is, if the external connection terminals 145' protrude toward the terminal holes 160' from the circuit board 140 along the gap G formed by the protrusion 165 having the second thickness "t2", and if the first thickness of each of the external connection terminals 145' is greater than the second thickness "t2" of each of the protrusions 165 and 166 (t1>t2), as shown in FIG. 9, the external connection terminals 145' can protrude to positions where the external connection terminals 145 overlap with the terminal holes 160' of the upper cover 160. In this case, since the external connection terminals 145' can block the terminal holes 160', the penetration of harmful substances through the terminal holes 160' can be inhibited.

Figure 10:
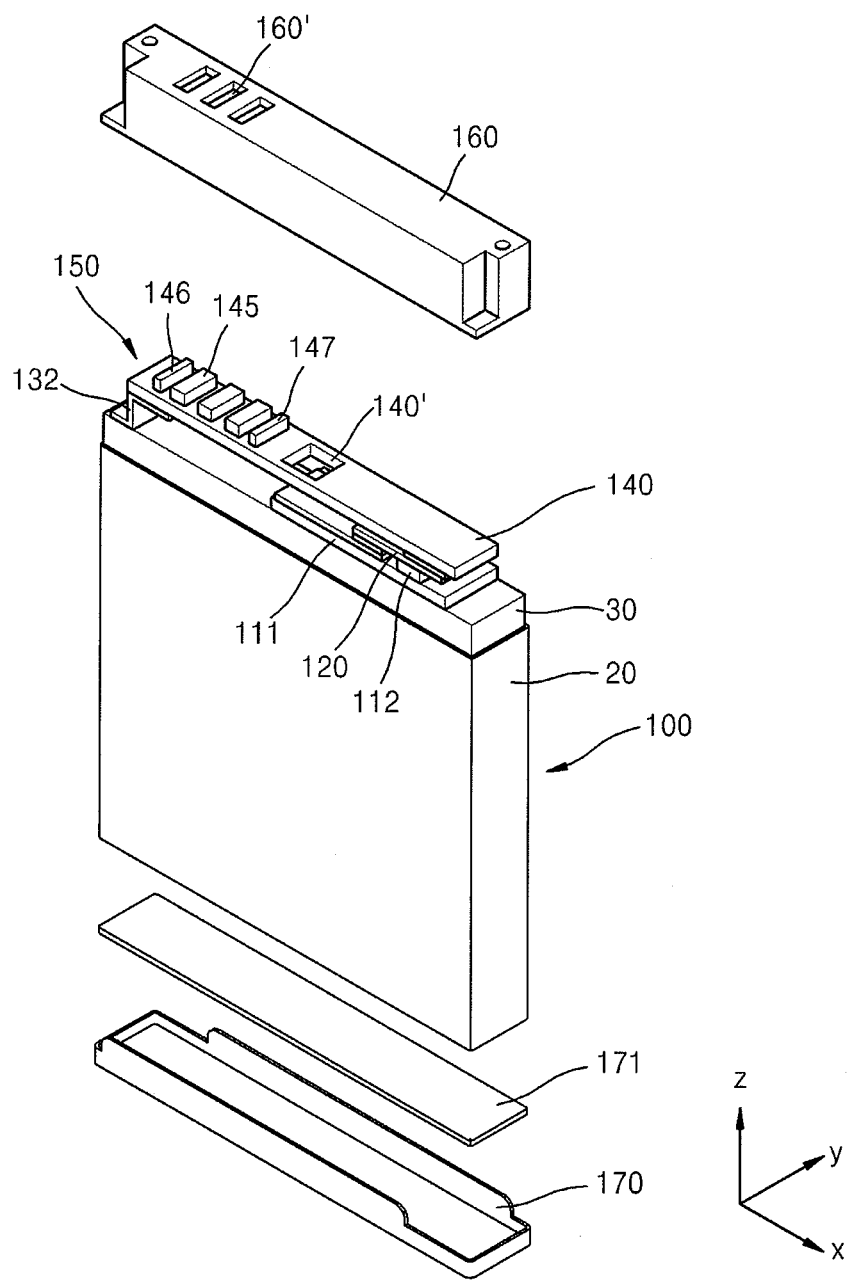
FIG. 10 is an exploded perspective view of a battery pack according to another embodiment of the present invention.
Figure 11:
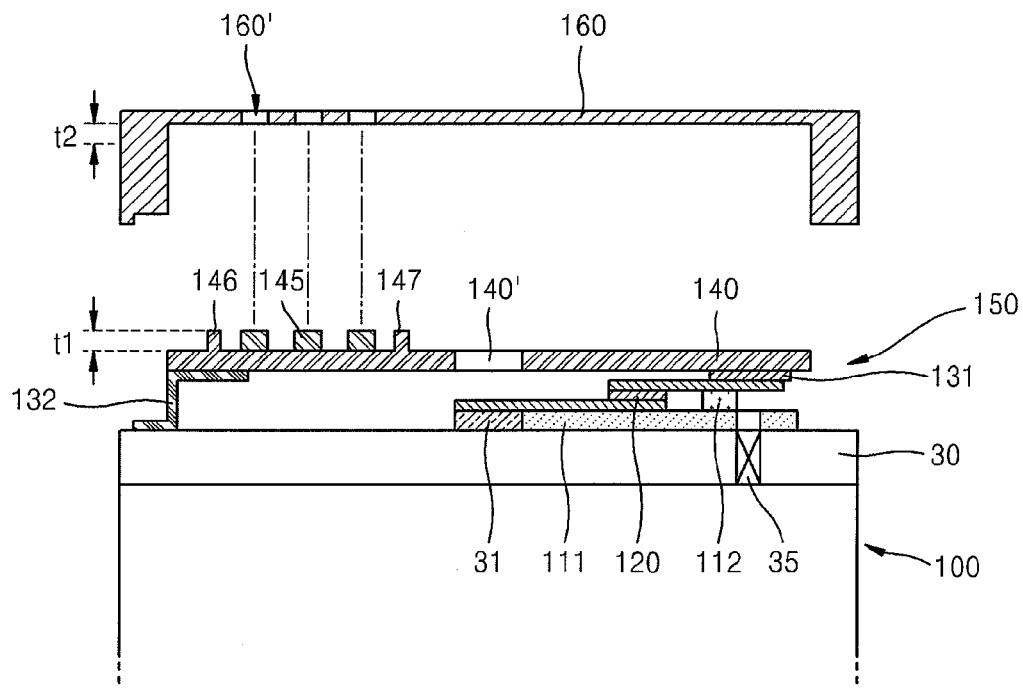
FIG. 11 is a cross-sectional view of the battery pack of FIG. 10 before an upper cover is assembled.
Figure 12:
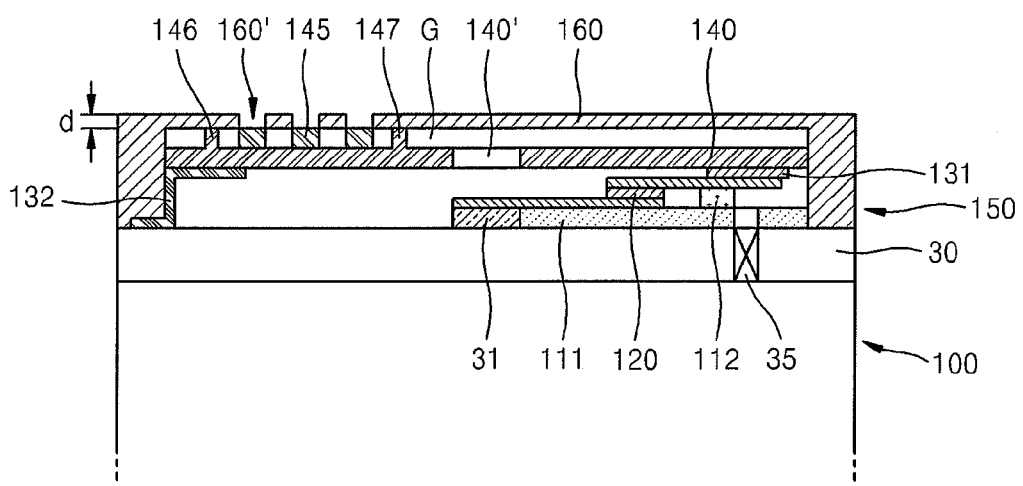
FIG. 12 is a cross-sectional view of the battery pack of FIG. 10 after the upper cover is assembled.

FIG. 10 is an exploded perspective view of a battery pack according to another embodiment of the present invention. FIGS. 11 and 12 are cross-sectional views of the battery pack of FIG. 10. Referring to FIGS. 10 through 12, the upper cover 160 may be assembled to the bare cell 100 on which the circuit board 140 is mounted, and protrusions 146 and 147 may be formed as a size control unit between the upper cover 160 and the circuit board 140.

The protrusions 146 and 147 may protrude from the circuit board 140, and extend to contact the upper cover 160. The protrusions 146 and 147 may support a constant gap G between the circuit board 140 and the upper cover 160, and may control terminal depths "d" of the terminal holes 160' formed in the upper cover 160 to a standardized size.

For example, the protrusions 146 and 147 may be formed adjacent to a plurality of external connection terminals 145, and may be formed at both sides of the external connection terminals 145. The protrusions 146 and 147 may be formed symmetrically about the external connection terminals 145, and may provide uniform terminal depths "d" to the plurality of external connection terminals 145.

For example, the protrusions 146 and 147 may be integrally formed with the circuit board 140, or may be separately formed from the circuit board 140 and then assembled to the circuit board 140. Alternatively, the upper cover 160 may be assembled to the circuit board 140 on which the protrusions 146 and 147 are mounted, and then the protrusions 146 and 147 may be fixed due to a fastening force between the upper cover 160 and the circuit board 140. That is, in the latter case, the protrusions 146 and 147 may be separately formed from the upper cover 160 and the circuit board 140, and then may be fixed between the upper cover 160 and the circuit board 140.

Figure 13:
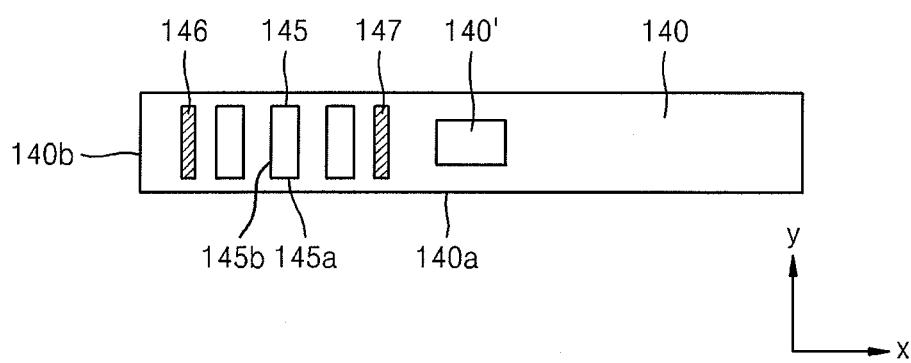
FIG. 13 is a plan view illustrating the upper cover on which a size control unit is formed.

FIG. 13 is a plan view illustrating a structure of the circuit board 140 on which the protrusions 146 and 147 are formed. Each of the protrusions 146 and 147 may have a slender shape extending in the direction of the short side (y direction) of the circuit board 140. That is, when the circuit board 140 has a substantially rectangular shape having a long side 140a and a short side 140b, each of the protrusions 146 and 147 may be formed in the direction of the short side 140b (y direction) (referred to as the short-side direction) of the circuit board 140. Since a plurality of electrical devices directly related to the function of the battery pack are mounted on the circuit board 140, mounting efficiency of the circuit board 140 may be improved by forming the protrusions 146 and 147 on a free area of the circuit board 140.

Each of the protrusions 146 and 147 may have a slender shape extending in a direction of the long side (y direction) of the external connection terminals 145. That is, when each of the external connection terminals 145 has a substantially rectangular shape having a long side 145b and a short side 145a, each of the protrusions 146 and 147 may be formed in the direction of the long side 145b (y direction) (referred to as the long-side direction) of each of the external connection terminals 145. The protrusions 146 and 147 formed in this way can eliminate the difference of the terminal depths "d" in the long-side direction (y direction) of the external connection terminals 145 and provide uniform terminal depths "d".

According to the present invention, since a size control unit for supporting a constant gap between an upper cover and a circuit board is formed, the terminal depth of a terminal hole formed in the upper cover may be constantly controlled with high precision. Accordingly, product specifications required by customers may be met and the failure rate may be reduced, thereby minimizing cost and processing losses due to defective products.

While the present invention has been particularly shown and described with reference to exemplary embodiments thereof, it will be understood by one of ordinary skill in the art that various changes in form and details may be made therein without departing from the spirit and scope of the present invention as defined by the following claims. Accordingly, the technical scope of the present invention should be determined only by the claims.

What is claimed is:

1. A battery pack comprising:
    a bare cell sealed by a cap plate;
    a circuit board having an upper surface disposed on the cap plate;
    a cover having a lower surface wherein the cover is coupled to the cap plate; and
    a size control unit formed between the lower surface of the cover and the circuit board so that the size control unit contacts the upper surface of the circuit board, wherein the size control unit comprises a protrusion protruding from the cover and contacting the circuit board.

2. The battery pack of claim 1, wherein the protrusion integrally formed with the cover.

3. The battery pack of claim 1, wherein the size control unit is separately formed from the circuit board and the cover, and comprises a member inserted between the circuit board and the cover.

4. The battery pack of claim 1, further comprising an external connection terminal formed on the circuit board,
    wherein a terminal hole is formed in the cover to expose the external connection terminal.

5. The battery pack of claim 4, wherein the size control unit is formed around the terminal hole.

6. The battery pack of claim 5, wherein a plurality of the size control units are formed at both sides of the terminal hole.

7. The battery pack of claim 5, wherein the size control unit has an elongate shape extending in a long-side direction of the terminal hole.

8. The battery pack of claim 4, wherein the size control unit is formed around the external connection terminal.

9. The battery pack of claim 8, wherein a plurality of the size control units are formed at both sides of the external connection terminal.

10. The battery pack of claim 8, wherein the size control unit has an elongate shape extending in a long-side direction of the external connection terminal.

11. The battery pack of claim 1, wherein the size control unit has an elongate shape extending in a short-side direction of the upper cover or the circuit board.

12. A battery pack comprising:
    a bare cell sealed by a cap plate;
    a circuit board having an upper surface disposed on the cap plate;
    a cover having a bottom surface wherein the cover is coupled to the bare cell; and
    a protrusion having a first surface contacting the bottom surface of the cover and a second surface contacting the upper surface of the circuit board.

13. The battery pack of claim 12, further comprising an external connection terminal formed on the circuit board,
    wherein a terminal hole is formed in the cover to expose the external connection terminal.

14. The battery pack of claim 13, wherein a plurality of the protrusions are formed at both sides of the external connection terminal and each protrusion has an elongate shape extending in a long-side direction of the external connection terminal.

15. The battery pack of claim 13, wherein a plurality of the protrusions are formed at both sides of the terminal hole, and each protrusion has an elongate shape extending in a long-side direction of the terminal hole.

* * * * *